United States Patent [19]
Schoen et al.

[11] Patent Number: 5,644,458
[45] Date of Patent: *Jul. 1, 1997

[54] INDUCTION MACHINE PROTECTION DEVICE

[75] Inventors: Randy Schoen, Decatur; Thomas G. Habetler, Snellville, both of Ga.

[73] Assignee: Siemens Energy & Automation, Inc., Alpharetta, Ga.

[*] Notice: The term of this patent shall not extend beyond the expiration date of Pat. No. 5,570,256.

[21] Appl. No.: 662,388

[22] Filed: Jun. 12, 1996

Related U.S. Application Data

[63] Continuation of Ser. No. 213,285, Mar. 15, 1994, Pat. No. 5,570,256.

[51] Int. Cl.$^6$ ........................................ H02H 5/04
[52] U.S. Cl. .................. 361/31; 361/78; 361/23; 318/802; 318/805
[58] Field of Search ........................ 361/23, 25, 30, 361/31, 33, 78, 79, 86, 87; 318/801, 802, 805, 808

[56] References Cited

U.S. PATENT DOCUMENTS

| | | | |
|---|---|---|---|
| 3,845,354 | 10/1974 | Boothman et al. | 361/24 |
| 4,319,298 | 3/1982 | Davis et al. | 361/24 |
| 4,647,825 | 3/1987 | Profio et al. | 318/395 |
| 4,939,437 | 7/1990 | Farag et al. | 318/473 |
| 5,345,158 | 9/1994 | Kliman et al. | 361/30 |
| 5,570,256 | 10/1996 | Schoen et al. | 361/31 |

OTHER PUBLICATIONS

*IQ-1000 Motor Protection System User's Manual*, 1987, Control Division, Westinghouse Electric Corporation.

*IQ-2000 Motor Command System: A New Concept in Motor Command*, Dennis Mueller, Sr. Engineer, General Control Div., Westinghouse Electric Corporation.

Primary Examiner—Jeffrey A. Gaffin
Assistant Examiner—Sally C. Medley

[57] ABSTRACT

A device and apparatus for monitoring faults in a three phase induction machine are disclosed herein. The device and method utilize values of the currents in the three phases and the voltages of the three phases to estimate a current portion which is not substantially affected by the load torque effects of the machine. This current portion is related to the unacceptable magnetic fields present in the machine. These fields are typically caused by electrical or mechanical problems in the machine, and when the current portion exceeds a predetermined limit, operation of the machine can be discontinued.

22 Claims, 3 Drawing Sheets

16,458

INDUCTION MACHINE PROTECTION DEVICE

CROSS-REFERENCE TO RELATED APPLICATION

This is a continuation of Ser. No. 08/213,285 filed Mar. 15, 1994 now U.S. Pat. No. 5,570,256.

FIELD OF THE INVENTION

The present invention relates to a device for detecting problems in an induction machine, and more particularly, relates to a device and method for monitoring the current and voltage of a 3-phase induction machine, analyzing the 3-phase currents and voltages, and detecting problems in the induction machine based upon the analysis of the 3-phase voltages and currents.

BACKGROUND OF THE INVENTION

A problem which is recognized in the operation of induction machines such as motors and generators is determining when the machine is experiencing a mechanical or electrical problem. These problems include rotor unbalance, eccentric air gaps, misalignment, broken rotor bars, electrical unbalances in the rotor, etc. Such problems arise as a result of a number of defects in the machine such as failing bearings, material and structural flaws introduced to the machine during manufacturing, and overheating during operation. These defects in machines typically result in alterations to the magnetic fields which would normally exist in the air gap of the machine, thereby producing non-uniform magnetic fields therein. As a result of non-uniform magnetic fields, harmonics are introduced into the current in the stator of the motor. Based upon these harmonics, one can determine whether or not an operating induction motor is experiencing one or more of the problems specified above.

It is known to monitor the condition of induction motors based upon monitoring the current which is applied to the motor. However, these known schemes ignore the effect of the mechanical torque load which the motor is operating under or assume that the motor is operating under a known load. As a result, such induction motor condition monitoring systems are typically suitable only to detect problems which introduce severe non-uniformities in the magnetic fields in the air gaps of the motor. Accordingly, these monitoring techniques may not detect problems which produce relatively small non-uniformity in the magnetic fields in the air gap which results in the inability to detect problems with the motor when they are first introduced into the motor and have not progressed to the point where they have caused substantial damage to the motor. Thus, these monitoring techniques may only detect motor problems which have progressed to the point where substantial damage may have occurred in the motor. While this type of monitoring may provide an advantage over discovering that a motor has problems before the motor completely ceases to function, it would be advantageous to provide a method of motor current monitoring which would detect motor problems at their early stages.

SUMMARY OF THE INVENTION

The present invention provides a monitoring device for determining the presence of unacceptable magnetic fields in an induction machine including a stator winding and a rotor winding. The device is coupled to at least one electrical conductor which supplies current and power to the induction machine, and includes a monitoring circuit coupled to the phase conductor to produce a signal representative of the current in the phase conductor. The device also includes a processing circuit coupled to the monitoring circuit to read the signal and determine a component of the current substantially unrelated to the mechanical torque load in the machine, and a comparator circuit coupled to the processing circuit to determine if the component is unacceptable. A switching device is coupled to the comparator circuit and is configured to interrupt the application of power to the machine from the electrical conductor when the component is unacceptable.

Another configuration of the device may include first, second and third transducers disposed to produce first, second and third signals representative of the voltages in three phase conductors which provide current to an induction machine such as an induction motor. The device also includes fourth, fifth and sixth transducers disposed to produce fourth, fifth and sixth signals representative of the currents in the three phase conductors, and a processing circuit coupled to the transducers to read the first, second, third, fourth, fifth and sixth signals to determine a component of the phase currents related to unacceptable magnetic fields in the machine. A comparator circuit coupled to the processing circuit determines if the value of the component is unacceptable, and a switching device coupled to the comparator circuit interrupts the application of power to the machine from the three phase conductors when the value of the component is unacceptable.

The present invention further provides a method for use with an induction machine having a stator and a rotor. The method identifies machine faults which influence magnetic field effects on stator current. The steps of reading current in at least one phase of the stator, separating the current reading into a first current portion which is a function of only load torque effects and a second current portion which is a function of load torque effects and other operational effects which influence magnetic field effects on stator current, and comparing the first and second current portions to produce a third current portion indicative of the other operational effects are part of the method.

DETAILED DESCRIPTION OF THE PREFERRED EMBODIMENT

Figure 1:
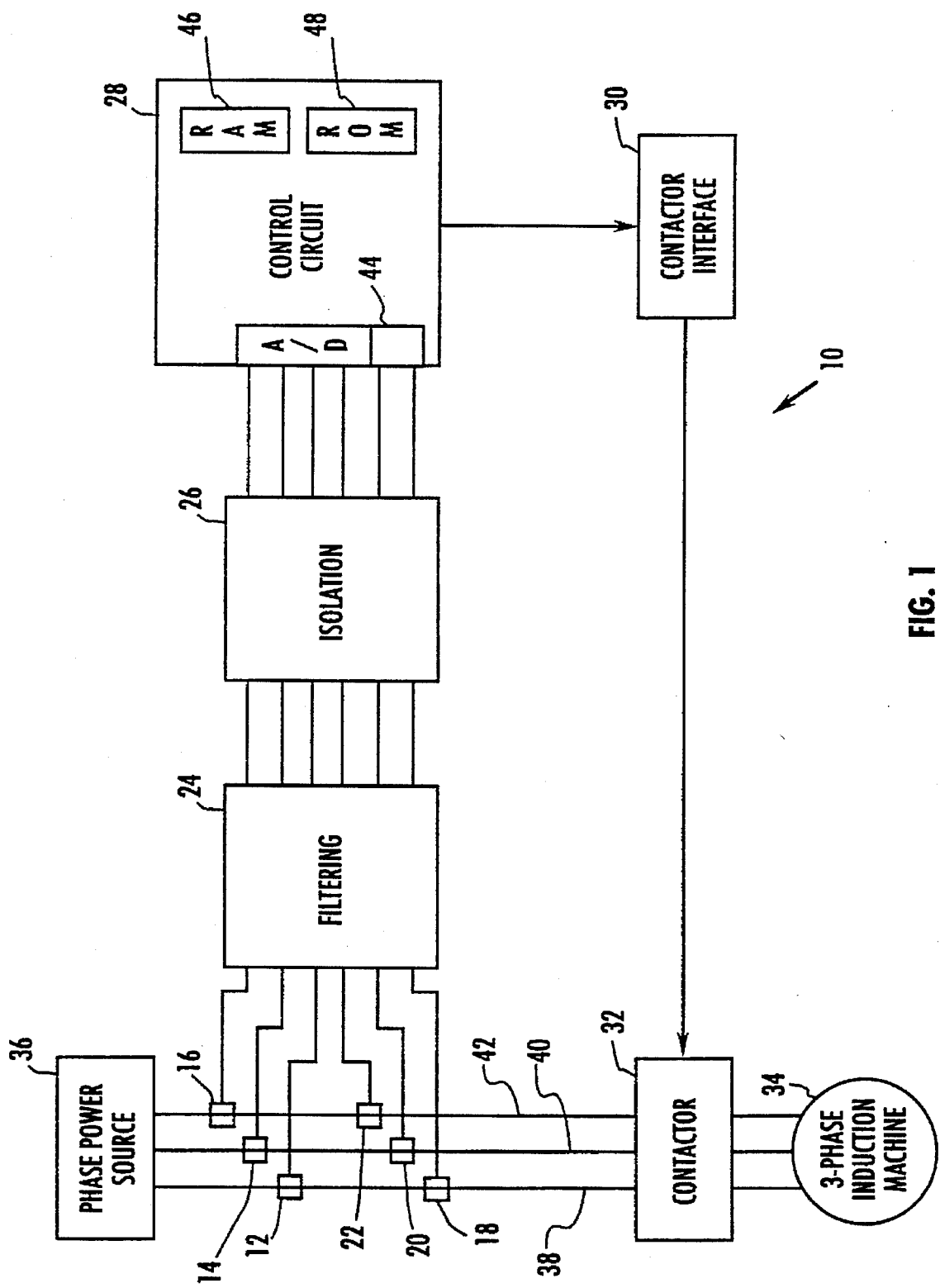
FIG. 1 is a system block diagram of an induction machine protection device.

Referring to FIG. 1, an induction machine protection device 10 includes voltage transformers 12, 14 and 16, current transformers 18, 20 and 22, a filtering and conditioning circuit 24, an isolation circuit 26, a control circuit 28, a contacter interface 30, and a contactor 32. Also illustrated in FIG. 1 is a 3-phase induction machine such as a 3-phase motor 34, and a 3-phase power source 36 which provides 3-phase power to motor 34 via A-phase conductor 38, B-phase conductor 40, C-phase conductor 42, and contactor 32. Also included in such a system is a neutral conductor (not shown) coupled between source 36 and machine 34.

In operation, voltage transformers 12, 14 and 16 (transducers) produce signals representative of (e.g., proportional to) the voltages of phase conductors 38, 40 and 42 ($v_a$, $v_b$, $v_c$). These voltages ($v_a$, $v_b$, $v_c$) are also the phase voltages in the stator of motor 34. Current transformers 18, 20 and 22 (transducers) produce signals representative of (e.g., proportional to) the currents in phase conductors 38, 40 and 42 ($i_a$, $i_b$, $i_c$). These currents are also the phase currents in the stator of motor 34. The signals produced by transformers 12, 14, 16, 18, 20 and 22 are filtered and converted to voltages in an appropriate circuit 24, and applied to an isolation circuit 26 such as a circuit which includes optical isolation. In systems which interface with 3-phase induction machines which operate at relatively high currents, it may be important to include an isolation circuit 26 to protect the circuitry of control circuit 28 against noise and possible damage. However, certain applications may not require an isolation circuit 26.

The signals from isolation circuit 26 which are representative of the signals produced by transformers 12, 14, 16, 18, 20 and 22 are applied to an analog-to-digital converter 44 which is part of control circuit 28. Analog-to-digital converter 44 converts the voltage signals representative of the signals produced by transformers 12, 14, 16, 18, 20 and 22 into digital data representative of these signals. Accordingly, analog-to-digital converter 44 produces real time digital data at a predetermined sampling interval which is representative of the voltages in each phase conductor 38, 40 and 42 and the electrical current in phase conductors 38, 40 and 42.

In the present embodiment of device 10, control circuit 28 is a microprocessor (digital processor) which includes analog-to-digital converter 44 as a circuit which is integral to the microprocessor. The microprocessor also includes the appropriate RAM 46 and ROM 48 (e.g., EPROM). The programming which controls the microprocessor is stored in ROM 48. The microprocessor utilizes RAM 46 to temporarily store variable data which is utilized during the execution of the programs stored in ROM 48. In operation, control circuit 28 may include programming which performs various monitoring functions of motor 34 which are based upon the digital values representative of the signals produced at transformers 12, 14, 16, 18, 20 and 22. For example, if the signals representative of the electrical current in conductors 38, 40 and 42 exceeds predetermined setpoint values stored in ROM 48, control circuit 28 may produce an output signal which is applied to contactor interface 30 and conditioned to control contactor 32. Based upon the control signal, the contacts of contactor 22 open and remove the 3-phase power from motor 34.

By way of example, contactor interface 30 may include isolation to prevent inductive kickback from contactor 32 to control circuit 28. Such a circuit also includes circuitry which can produce sufficient current to operate the solenoid of contactor 32. U.S. Pat. No. 4,939,437 issued to Farag et al. on Jul. 3, 1990, the full disclosure of which is incorporated herein, describes circuitry for interfacing current transformers and a 3-phase contactor with a microprocessor based motor control and protection device.

Figure 2:
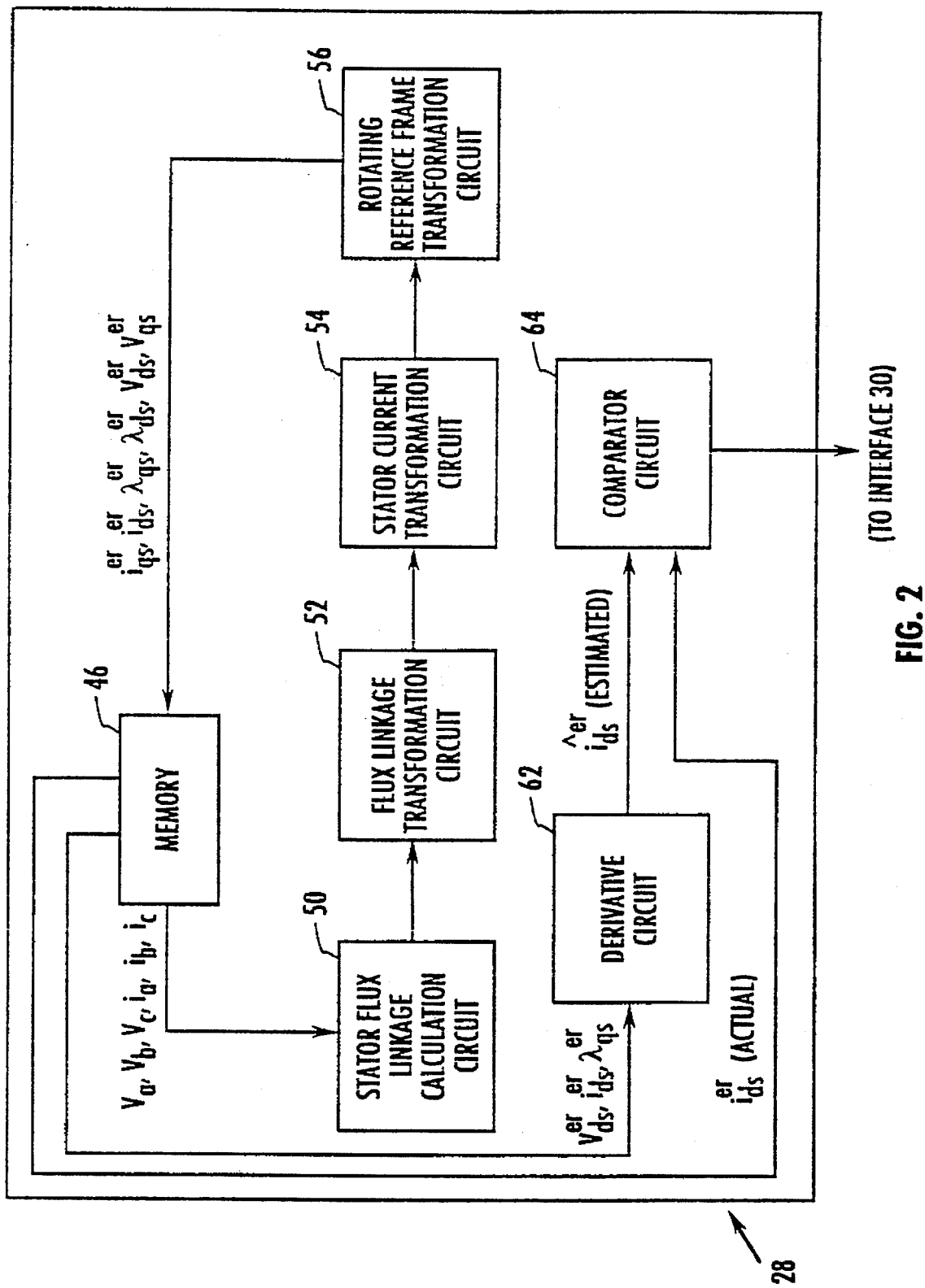
FIG. 2 is a block diagram representation of the control circuit for the protection device.

In the present embodiment of control circuit 28, control circuit 28 is configured (programmed) to, in effect, produce a control circuit as represented in FIG. 2 which transforms the 3-phase (A$\phi$, B$\phi$, C$\phi$) stator currents ($i_a$, $i_b$, $i_c$) to produce digital data used to determine if problems exist in motor 34. The control circuit includes a stator flux linkage calculation circuit 50, a flux linkage transformation circuit 52, a stator current transformation circuit 54, and a rotating reference frame transformation circuit 56.

Stator flux linkage calculation circuit 50 calculates digital data representative of the flux linkages for the a, b and c phase stator windings of motor 34 based upon $v_a$, $v_b$, $v_c$, $i_a$, $i_b$, $i_c$ using the following equations, which are included in the programming for circuit 28:

$$\lambda_a = \int_o^t (v_a - i_a R_s) dt \approx \int_o^t v_a dt \tag{1}$$

$$\lambda_b = \int_o^t (v_b - i_b R_s) dt \approx \int_o^t v_b dt \tag{2}$$

$$\lambda_c = \int_o^t (v_c - i_c R_s) dt \approx \int_o^t v_c dt \tag{3}$$

where $\lambda_a$, $\lambda_b$ and $\lambda_c$ add X: are the flux linkages for the a, b and c phase orator windings, respectively, and $R_3$ is the resistance of the statcr of motor 34.

Figure 3:
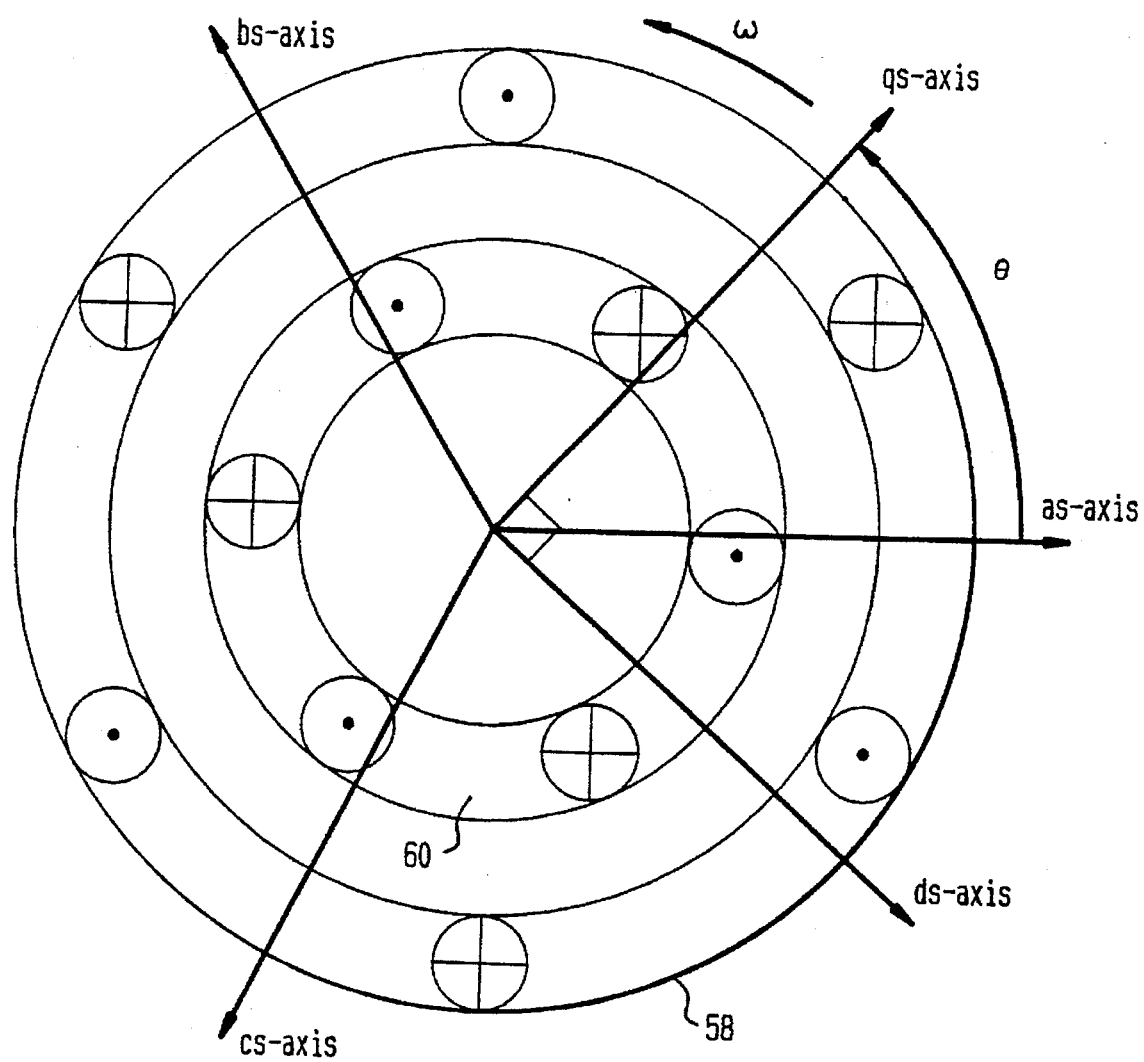
FIG. 3 is a graphical representation of the stator and motor windings for an induction motor.

Flux linkage transformation circuit 52 converts (transforms) the $\lambda_a$, $\lambda_b$ and $\lambda_c$ flux linkages from the 3-phase rotational reference frame to a two-axis reference frame which is stationary relative to the stator windings. In particular, the stationary reference is to the direct axis (d-axis) and the quadrature axis (q-axis) which is offset 90° from the d-axis. FIG. 3 is a graphical representation of stator windings 58 and rotor windings 60 of induction motor 34. FIG. 3 also illustrates the orientation of the axes as; bs and cs, respectively, for the $i_a$, $i_b$ and $i_c$ currents. Also illustrated are the ds-axis of current $i_{ds}$ and the qs-axis of current $i_{qs}$. Currents $i_{ds}$ and $i_{qs}$, are the sum of the projections of currents $i_a$, $i_b$ and $i_c$ on the ds and qs axes, respectively. In 3-phase induction motor 34 powered by the 60 Hz alternating current power source 36, axes as, bs and cs are offset by 120°, and axes as, bs, cs, ds and qs rotate at an angular velocity of 120 $\pi$ radians/second ($\omega$) relative to stator windings 58.

Circuit 52 performs the conversion of flux linkages $\lambda_a$, $\lambda_b$ and $\lambda_c$ to digital data representative of the stator direct axis flux linkage $\lambda_{ds}$ and the stator quadrature axis flux linkage $\lambda_{qs}$, based upon the following equations:

$$\begin{bmatrix} \lambda_{qs}^s \\ \lambda_{ds}^s \end{bmatrix} = T(0) \begin{bmatrix} \lambda_a \\ \lambda_b \\ \lambda_c \end{bmatrix} \tag{4}$$

$$T(0) = \frac{3}{2} \begin{bmatrix} 1 & \frac{1}{2} & \frac{1}{2} \\ 0 & \frac{\sqrt{3}}{2} & \frac{\sqrt{3}}{2} \end{bmatrix} \tag{5}$$

where T(O) includes the constants which properly orient the ds-axis and qs-axis with respect to the as, bs and cs axes.

Stator current transformation circuit 54 converts (transforms) digital data representative of the phase currents $i_a$, $i_b$ and $i_c$ to stator direct axis current $i_{ds}^s$ and stator quadrature axis current $i_{qs}^s$. Circuit 54 also converts the stator phase voltages $v_a$, $v_b$ and $v_c$ to digital data representative of stator direct axis voltage $v_{ds}^s$ and stator quadrature axis voltage $v_{qs}^s$. These conversions are performed based upon the following equations:

$$\begin{bmatrix} i_{qs}^s \\ i_{ds}^s \end{bmatrix} = T(0) \begin{bmatrix} i_a \\ i_b \\ i_c \end{bmatrix} \tag{6}$$

$$\begin{bmatrix} v_{qs}^s \\ v_{ds}^s \end{bmatrix} = T(0) \begin{bmatrix} v_a \\ v_b \\ v_c \end{bmatrix} \quad (7)$$

Rotating reference frame transformation circuit 56 converts (transforms) currents $i_{qs}^s$ and $i_{ds}^s$ to digital data representative of currents $i_{qs}^{er}$ and $i_{ds}^{er}$. Quadrature and direct axis currents $i_{qs}^{er}$ and $i_{ds}^{er}$ are aligned with the rotor flux vector. Circuit 56 similarly converts voltages $v_{qs}^s$ and $v_{ds}^s$ to digital data representative of voltages $v_{qs}^{er}$ and $v_{ds}^{er}$. Quadrature and direct axis voltages $v_{qs}^{er}$ and $v_{ds}^{er}$ are aligned with the rotor flux vector. These conversions are based upon the following equations:

$$\begin{bmatrix} i_{qs}^{er} \\ i_{ds}^{er} \end{bmatrix} = T(\theta_r) \begin{bmatrix} i_{qs}^s \\ i_{ds}^s \end{bmatrix} \quad (8)$$

$$\begin{bmatrix} v_{qs}^{er} \\ v_{ds}^{er} \end{bmatrix} = T(\theta_r) \begin{bmatrix} v_{qs}^s \\ v_{ds}^s \end{bmatrix} \quad (9)$$

$$T(\theta_r) \begin{bmatrix} \cos\theta_r & \sin\theta_r \\ -\sin\theta_r & \cos\theta_r \end{bmatrix} \quad (10)$$

where $\theta_r$ is calculated as shown in equation 13 below.

Circuit 56 also produces digital data representative of flux linkage vectors $\lambda_{qs}^{er}$ and $\lambda_{ds}^{er}$ which are aligned with the rotor flux. This conversion is based upon the following equation:

$$\begin{bmatrix} \lambda_{qs}^{er} \\ \lambda_{ds}^{er} \end{bmatrix} = T(\theta_r) \begin{bmatrix} \lambda_{qs}^s \\ \lambda_{ds}^s \end{bmatrix} \quad (11)$$

Circuit 28 is programmed to combine flux linkage vectors $\lambda_{qs}^{er}$ and $\lambda_{ds}^{er}$ to produce digital data representative of a resultant vector having a scalar value at an angle $\theta_r$ from $\lambda_{ds}^{er}$. In particular, the magnitude of the resultant flux is:

$$\sqrt{(\lambda_{qs}^{er})^2 + (\lambda_{ds}^{er})^2} \quad (12)$$

and $$\theta_r = \tan^{-1}\left(\frac{\lambda_{qs}^{er}}{\lambda_{ds}^{er}}\right) \quad (13)$$

Equations 1-13 are included in the programming for circuit 28 to configure circuit 28 to manipulate data as described above in reference to FIG. 2. Circuit 28 is also programmed to, in effect, produce a derivative circuit 62 and a comparator circuit 64.

Circuit 62 calculates digital data representative of the rate of change of the direct-axis flux linkage aligned with the rotor flux $$\left(\frac{d\lambda_{ds}^{er}}{dt}\right)$$

based upon $v_{ds}^{er}$, $i_{ds}^{er}$, $\lambda_{qs}^{er}$ and $\omega_c$ as follows:

$$\frac{d\lambda_{ds}^{er}}{dt} = v_{ds}^{er} - R_s i_{ds}^{er} + \omega_e \lambda_{qs}^{er} \quad (14)$$

where $R_s$ is the electrical resistance of the stator for motor 34 and $\omega_c$ is the frequency of the current supplied by source 36 (e.g. 60 Hz). Based upon $$\frac{d\lambda_{ds}^{er}}{dt} \quad (15)$$

circuit 62 calculates digital data representative of the rate of change of the direct-axis current aligned with the rotor flux $$\left(\frac{di_{ds}^{er}}{dt}\right) \quad (16)$$

as follows:

$$\frac{di_{ds}^{er}}{dt} = \frac{R_r L_s i_{ds}^{er} - R_r \lambda_{ds}^{er} - L_r \frac{d\lambda_{ds}^{er}}{dt}}{L_m^2 - L_r L_s} \quad (15)$$

where $R_r$ is the electrical resistance of the rotor for motor 34, $L_s$ is the inductance of the stator for motor 34, $L_m$ is the mutual inductance, and $L_r$ is the inductance of the rotor for motor 34. These values are dependent on motor type and size and are stored in ROM 48.

The calculations performed in equations 1-15 are performed one time during each sampling period which elapses during the operation of device 10. The length of time for the sampling periods is determined based upon such considerations as the sampling frequency of A/D 44, the speed of the processor in circuit 28, the degree of protection required for motor 34, the type of filtering (analog or digital) used to filter the signals from transformers 12, 14, 16, 18, 20 and 22, and the frequency $\omega_c$. By way of example, the sampling period may be in the range of 0.2 to 2 milliseconds.

Subsequent to calculating $$\frac{di_{ds}^{er}}{dt}$$

for a given sampling period, digital data representative of $i_{ds}^{er}$ can be estimated ($\hat{i}_{ds}^{er}$) for the next sampling period using a known method such as Euler's method as embodied in the following equation:

$$\hat{i}_{ds,n+1}^{er} = i_{ds}^{er} + h * \frac{di_{ds}^{er}}{dt} \quad (16)$$

where h is the length of the sampling period.

Circuit 64 compares $\hat{i}_{ds}^{er}$ (estimated direct-axis current aligned with the rotor flux calculated during the n−1 sampling period) with $i_{ds}^{er}$ (actual direct-axis current aligned with the rotor flux calculated during the nth sampling period) and produces a fault or warning signal if the difference between $\hat{i}_{ds}^{er}$ and $i_{ds}^{er}$ as exceeds a predetermined limit (e.g. 1% to 25%). This difference is the component of motor current substantially unrelated to the mechanical torque load, and substantially related only to unacceptable magnetic fields. (This comparison removes the effects of cross-coupling between the direct and quadrature axis which may impact fault detection.)

Circuit 28 applies the fault signal to interface 30 which, in response to the fault signal, applies a control signal to contactor 32. The control signal de-energizes the coil of contactor 32 to open the contacts of contactor 32 and remove power to motor 34.

By way of modification, circuit 28 may be programmed to detect motor 34 problems based upon direct and quadrature currents ($i_{qs}^e$ and $i_{ds}^e$) which are aligned with the stator flux vector. In particular, an analysis of induction motor characteristics will show that motor problems unrelated to mechanical torque loads (e.g. eccentric air gaps, misalignment, broken rotor bars, etc.) will have effects generally limited to the direct-axis current ($i_{ds}^e$) Thus, if $i_{ds}^e$ is estimated from $i_{qs}^e$, rather than measured directly, the estimated value of $i_{ds}^e$ ($\hat{i}_{ds}^e$) will not include the effects of motor problems Upon determining $\hat{i}_{ds}^e$, this value can be compared to the actual value of $i_{ds}^e$ to produce a fault signal as discussed above.

Turning now to the calculation of $\hat{i}_{ds}^e$ based upon $i_{qs}^e$, this calculation can be performed based upon the following equation:

$$\hat{i}_{ds}^e = \frac{\omega_s \tau_r \lambda_{ds}^e - L_s\left(1 + \sigma \tau_r \frac{d}{dt}\right) i_{qs}^e}{\omega_s \tau_r \sigma L_s} \quad (17)$$

where $\omega_s$ is the slip frequency of motor 34, $\tau_r = L_r/R_r$, and $\sigma = 1 - L_m^2/(L_r L_s)$. $\lambda_{ds}^e$ and $\lambda_{qs}^e$ are calculated using equations which are the same as those used to calculate $\lambda_{ds}^{er}$ and $\lambda_{qs}^{er}$ with the exception that $\theta_r$ is replaced with $\theta_s$, where $\theta_s$ is calculated as follows:

$$\theta_s = \tan^{-1}\left(\frac{\lambda_{qs}}{\lambda_{ds}}\right) \quad (18)$$

One drawback with this method for calculating $\hat{i}_{ds}^e$ is that $\omega_s$ must be assumed as constant, or calculated based upon the actual speed of motor 34. Since the slip frequency depends on torque and the present device 10 detects motor problems most reliably when torque is not assumed constant, $\omega_s$ should be calculated based upon the actual speed of motor 34.

It will be understood that the description above is of the preferred exemplary embodiment of the invention and that the invention is not limited to the specific forms shown and described. For example, depending upon the specific microprocessor used in circuit 28 and the level of protection required for motor 34, the various equations may be modified and/or solved using various techniques in order to optimize the performance of circuit 28. It is further contemplated that circuit 28 can be programmed to detect overload conditions and ground fault conditions in order to control contactor 32. Other substitutions, modifications, changes and omissions may be made in the design and arrangement of the preferred embodiment without departing from the spirit of the invention as expressed in the appended claims.

What is claimed is:

1. A monitoring device coupled to three electrical phase conductors supplying current and power to an induction machine including a stator winding and a rotor winding, for determining the presence of unacceptable magnetic fields in the machine, the device comprising:

a monitoring circuit coupled to the phase conductors to produce three current signals representative of the current in the phase conductors;

a processing circuit coupled to the monitoring circuit to determine the direct-axis current signal by analysis of the three current signals, and to monitor said direct-axis current signal to distinguish a component of the current substantially unrelated to the mechanical torque load in the machine;

a comparator circuit coupled to the processing circuit to determine if the component is unacceptable; and a switching device coupled to the comparator circuit and configured to interrupt the application of power to the machine from the electrical conductor when the component is unacceptable.

2. The device of claim 1, wherein the induction machine is a motor.

3. The device of claim 1, wherein the monitoring circuit comprises a current transformer configured for coupling to the electrical conductors.

4. The device of claim 1, wherein the processing circuit and the comparator circuit are included in a programmed digital processor.

5. The device of claim 4 further comprising a memory for storing a predetermined value for the component, and wherein the comparator circuit is programmed to compare the component of current substantially unrelated to the mechanical torque load to the predetermined value to determine acceptability.

6. A monitoring device coupled to three phase conductors which supply power to an induction machine including a stator winding and rotor winding, for determining the presence of unacceptable magnetic fields in the machine, the device comprising:

a monitoring circuit coupled to the phase conductors to produce signals representative of the currents in the phase conductors;

a processing circuit coupled to the monitoring circuit to determine the direct-axis current in said machine by analysis of said phase current signals, and to monitor said direct-axis current signal to distinguish a component of the phase currents substantially related only to unacceptable magnetic fields in the machine;

a comparator circuit coupled to the processing circuit to determine if the value of the component is unacceptable; and a switching device coupled to the comparator circuit and configured to interrupt the application of power to the machine from the three phase conductors when the value of the component is unacceptable.

7. The device of claim 6, wherein the machine is a motor and the processing circuit is included in a programmed digital processor, the digital processor being programmed to produce digital data representative of the stator flux linkages based upon the signals representative of the phase currents.

8. The device of claim 7, wherein the processing circuit is programmed to produce digital data representative of the stator direct axis flux linkage and the stator quadrature axis flux linkage based upon the data representative of the stator flux linkages.

9. The device of claim 8, wherein the processing circuit is programmed to produce digital data representative of the stator direct axis current and the quadrature axis current based upon the signals representative of the phase currents.

10. A monitoring device coupled to three phase conductors which supply power to an induction machine including a stator winding and a rotor winding, for determining the presence of unacceptable magnetic fields in the machine, the device comprising:

first, second and third transducers disposed to produce first, second and third signals representative of the voltages in the three phase conductors, respectively;

fourth, fifth and sixth transducers disposed to produce fourth, fifth and sixth signals representative of the currents in the three phase conductors, respectively;

a processing circuit coupled to the transducers to read the first, second, third, fourth, fifth and sixth signals, the processing circuit determining direct-axis and quadrature-axis current signals responsive to said fourth, fifth and sixth signals, and monitoring one or both of said direct-axis and quadrature-axis current signals to distinguish a component of the phase currents related to unacceptable magnetic fields in the machine;

a comparator circuit coupled to the processing circuit to determine if the value of the component is unacceptable; and a switching device coupled to the comparator circuit and configured to interrupt the application of power to the machine from the three phase conductors when the value of the component is unacceptable.

11. The device of claim 10, wherein the component of the phase currents is substantially unrelated to the torque of the machine and the processing circuit is included in a programmed digital processor, the digital processor being programmed to produce digital data representative of the stator flux linkages based upon the signals representative of the phase currents.

12. The device of claim 11, wherein the processing circuit is programmed to produce digital data representative of the stator direct axis flux linkage and the stator quadrature axis flux linkage based upon the data representative of the stator flux linkages.

13. The device of claim 12, wherein the processing circuit is programmed to produce digital data representative of the stator direct axis current and the quadrature axis current based upon the signals representative of the phase currents, and produce digital data representative of the stator direct axis voltage and the quadrature axis voltage based upon the signals representative of the phase voltages.

14. The device of claim 13, wherein the processing circuit is programmed to produce digital data representative of the actual direct axis current aligned with the rotor flux based upon the data representative of the stator direct and quadrature axis currents and the data representative of the stator direct and quadrature axis voltages.

15. A monitoring device coupled to three phase conductors which supply power to an induction machine including a stator winding and a rotor winding, and determining the presence of unacceptable magnetic fields in the machine, the device comprising:

means for producing three phase current signals representative of the currents in the phase conductors;

means for determining the direct-axis current in said machine by analysis of said phase current signals, and for monitoring said direct-axis current signal to determine a component of the phase currents substantially related only to unacceptable magnetic fields in the machine;

means for determining if the value of the component is unacceptable; and means for interrupting the application of power to the machine from the three phase conductors when the value of the component is unacceptable.

16. The device of claim 15, wherein the means for determining the direct-axis current produces digital data representative of the stator flux linkages based upon the signals representative of the phase currents.

17. The device of claim 16, wherein the means for determining the direct-axis current produces digital data representative of the stator direct axis flux linkage and the stator quadrature axis flux linkage based upon the data representative of the stator flux linkages.

18. The device of claim 17, wherein the means for determining the direct-axis current produces digital data representative of the stator direct axis current and the quadrature axis current based upon the signals representative of the phase currents.

19. In an induction machine having a stator and a rotor and driven by three phase currents, a method for identifying machine faults which influence magnetic field effects on stator current, the method comprising the steps of:

measuring the three phase currents separately;

determining the direct-axis current by analysis of the relationship between the three phase currents;

monitoring the direct-axis current as a function of time;

separating the direct-axis current into a first current portion which is a function of only load torque and a second current portion which is a function of operating conditions other than load torque responsive to variation in said direct-axis current as a function of time; and comparing the first and second current portions to detect indication of machine faults.

20. The method of claim 19, further comprising the step of analyzing the first and, second current portions to derive operational indicia of the induction machine.

21. The method of claim 20, further comprising the step of correlating the operational indicia with induction machine faults.

22. The method of claim 21, further comprising the step of reading the voltage in at least one phase of the stator, where the step of separating is based upon the voltage.

* * * * *